US007283884B2

United States Patent
Walters

(10) Patent No.: US 7,283,884 B2
(45) Date of Patent: Oct. 16, 2007

(54) METHODS PROVIDING FOR REMOTE SYSTEM DESIGN OF RETROFIT CIRCULATION SYSTEM FOR A POOL

(75) Inventor: Eric J. Walters, Modesto, CA (US)

(73) Assignee: Pool Power LLC, San Carlos, CA (US)

( * ) Notice: Subject to any disclaimer, the term of this patent is extended or adjusted under 35 U.S.C. 154(b) by 106 days.

(21) Appl. No.: 11/191,089

(22) Filed: Jul. 27, 2005

(65) Prior Publication Data

US 2007/0027564 A1    Feb. 1, 2007

(51) Int. Cl.
    G06F 19/00    (2006.01)
(52) U.S. Cl. .................. 700/97; 700/105; 715/751
(58) Field of Classification Search ............... 700/17, 700/83–85, 90, 94–97, 105–107; 348/86, 348/143; 379/102.1–106.1; 705/16, 21; 715/705, 716, 727, 751–759, 961, 964–967, 715/969, 970, 978
See application file for complete search history.

(56) References Cited

U.S. PATENT DOCUMENTS

| | | | | |
|---|---|---|---|---|
| 5,748,104 A | * | 5/1998 | Argyroudis et al. ... | 340/870.11 |
| 5,892,758 A | * | 4/1999 | Argyroudis ............ | 370/335 |
| RE36,602 E | * | 3/2000 | Sebastian et al. ...... | 700/97 |
| 6,110,213 A | * | 8/2000 | Vinciarelli et al. ..... | 703/1 |
| 6,244,015 B1 | * | 6/2001 | Ito et al. ............... | 52/741.1 |
| 6,522,531 B1 | * | 2/2003 | Quintana et al. ....... | 361/683 |
| 6,694,355 B1 | * | 2/2004 | Bahar .................... | 709/217 |
| 6,889,150 B2 | * | 5/2005 | Neuhaus et al. ........ | 702/85 |
| 6,956,614 B1 | * | 10/2005 | Quintana et al. ....... | 348/373 |
| 6,962,277 B2 | * | 11/2005 | Quintana et al. ....... | 224/262 |
| 7,143,415 B2 | * | 11/2006 | Connelly et al. ....... | 719/310 |
| 7,149,936 B2 | * | 12/2006 | Deshpande et al. ..... | 714/57 |
| 2004/0175002 A1 | * | 9/2004 | Christensen et al. .... | 381/59 |
| 2005/0044232 A1 | * | 2/2005 | Keane .................... | 709/227 |
| 2006/0004638 A1 | * | 1/2006 | Royal et al. ............ | 705/26 |
| 2006/0131382 A1 | * | 6/2006 | Thatcher ................ | 235/376 |

* cited by examiner

*Primary Examiner*—M. N. Von Buhr
(74) *Attorney, Agent, or Firm*—Stallman & Pollock LLP

(57) ABSTRACT

A two-way communication and data transfer system allows a field technician and a designer to work together to create a retrofit design for a flow system, make a cost estimate for the retrofit, and gather an approval from a customer all in a single visit to the customer site. The field technician can utilize a remote unit including a digital camera, data entry device, and communication device, which allows the technician to transfer images and dimension information about the existing system to a base unit. A designer can take this information from the base unit and generate a virtual design for a new system, allowing a virtual view and cost estimate to be generated for display to the customer. The technician and the designer can communicate during the process to improve the accuracy of the design and estimate.

21 Claims, 6 Drawing Sheets

METHODS PROVIDING FOR REMOTE SYSTEM DESIGN OF RETROFIT CIRCULATION SYSTEM FOR A POOL

TECHNICAL FIELD OF THE INVENTION

The present invention relates to the design of installations such as systems providing for fluid transport.

BACKGROUND

In many industries in which a flow of fluid is utilized, it is desirable to maximize flow, or minimize flow resistance, in order to reduce the amount of equipment runtime necessary to push through a given volume of fluid. By reducing the amount of runtime, the amount of wear and tear on the equipment can be reduced, and the cost of running the equipment can be significantly lowered. In industries such as the pool industry, for example, an increase in the throughput of water passed through a filter pump and recirculated through the pool can reduce the necessary runtime of the pump, thereby reducing the cost of gas or electricity necessary to run the pump. A major obstacle to flow in the pool industry is the use of standard piping components, such as 90° elbows, 45° fittings, unions, tees, and crosses, made from materials such as PVC and assembled with materials such as PVC cement, Teflon® tape, or silicone cement. While these basic elements are cheap and readily available at most hardware stores, they can result in sharp turns and other partial barriers that can lead to a significant reduction in flow, compared to a more linear or smooth run, as known in the art for flow of a fluid.

A swimming pool can be retrofitted to provide for improved flow. Existing retrofits come with several disadvantages, however. One disadvantage is that the person doing the retrofit generally is limited to standard plumbing components in standard sizes and shapes. As such, only limited improvement can be obtained by redirecting the flow, such as flow from a suction pipe to the main circulation pump. Further, it takes a substantial amount of time to retrofit a plumbing installation. It typically is necessary for a salesman to go to the site and take measurements, then go offsite to determine the necessary piping and associated costs, then return to the client at a later time for approval, a signature, and a deposit. Subsequently, an installer will be sent in to dismantle the existing piping and equipment and install new components. The installer must build the new piping using standard parts, oftentimes using parts not carried on the installer's truck, such that the installer has to make at least one trip to the hardware store during installation. The installation also will require a significant amount of cutting and gluing, such that a standard installation can easily take over eight hours of time. The amount of time not only increases the cost of each retrofit, but lowers the number of pools that can be retrofitted in a given period of time by a single technician.

DETAILED DESCRIPTION

Systems and methods in accordance with various embodiments of the present invention can overcome various deficiencies in existing approaches to designing and/or retrofitting systems such as systems providing for a flow of fluid. In one embodiment, a technician can collect information from a site that can be transmitted to a base location, where a design for a new system can be created, which can be relayed back to the technician for communication to a customer in a single customer meeting. The technician and persons at the base location can communicate during the design process in order to ensure an accurate design. In another embodiment, a new system can be designed on-site using information gathered by the technician. Once a system is selected and approved by the customer, an equipment kit can be generated that includes everything necessary to retrofit/convert the old system to the newly designed system or to install a new system. This allows an installer to quickly and easily do the work without the need to go offsite during installation for additional parts or to spend time cutting and cementing existing parts. Such approaches can reduce the amount of time the customer has to meet with a technician, allow designs to be generated and approved in a single visit, reduce the amount of travel time, and can allow a kit to be designed such that an installer visiting the site only has to view instructions and install the kit without having to gather parts and/or cut and cement existing parts.

Figure 1:
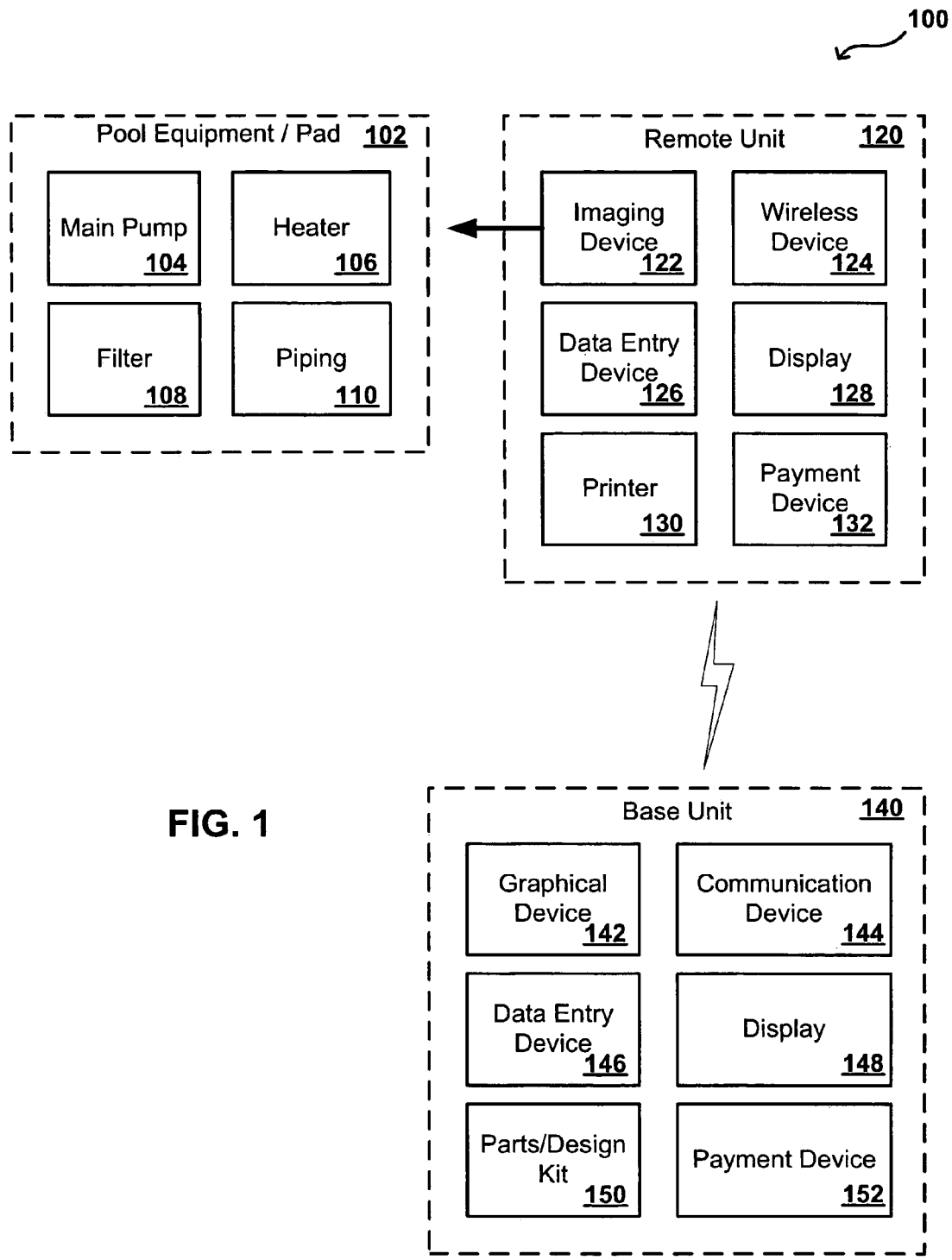
FIG. 1 is a diagram of a communication system that can be used in accordance with one embodiment of the present invention.

FIG. 1 shows a diagram of a communication and data transfer system 100 that can be used in accordance with various embodiments. The use of such a system will be discussed with respect to the retrofit of an existing pool equipment structure, but it should be understood that this is merely exemplary and should not be read as a limitation on the scope of the embodiments discussed herein. In a swimming pool example, a customer can request a quotation for a retrofit of the piping equipment for a backyard swimming pool. A field technician can be dispatched to meet the customer at a given time in the backyard of the customer. Once there, the customer can lead the technician to the pool and the equipment pad 102 containing various pool equipment, typically including a main pump 104 for circulating water through the pool, a filter 108 for catching fine debris or contaminants that may have slipped through a pool skimmer, and a heater 106 for heating the pool water to a desired temperature. The equipment pad also will have various runs of piping 110 connecting the various pieces of equipment and pipes running to and from the pool.

The field technician can utilize a remote unit 120 to collect information about the pool equipment 102 to be retrofit. The remote unit can be a single self-contained device, or can include a number of separate devices that can be connected as necessary. If a remote unit contains a cellular phone for voice communications, for example, there may be no need for the cellular phone to be connected to the other components of the remote unit, particularly if the other components include a data transfer device capable of transferring information to a base unit. An exemplary remote unit can include an imaging device 122 allowing the technician to capture various images of the pool and the pool equipment 120. The imaging device can be any appropriate device known for capturing two- or three-dimensional images, such as a digital camera or laser scanner. The remote unit can include a data entry device 126, such as any of the various data entry devices known in the art such as a keyboard, mouse, joystick, stylus, or touch screen, allowing a technician having taken measurements of the pool and pool equipment to enter the information into the remote unit. In another embodiment, a scanner such as a laser scanner or radar device can be used to capture the information and dimension measurements together, such that a separate image capture device and data entry device may not be necessary. A data entry device still can be useful to input customer and other information. The remote unit can include a display device 128, such as a monitor, for allowing the technician to enter and/or view collected information, as well as to display the images and information to the customer. The remote unit can include a wireless device 124, such as a cellular phone and/or cellular modem, allowing the technician to upload the information and images to a base unit. The wireless device also can allow the technician to communicate with persons at the base unit, or a separate communications device such as a cellular phone can be used. If a cellular phone is used to transfer data from a laptop device, for example, then the cellular phone can have a data connection to the laptop. If data is transferred via a cellular modem of the laptop, then the cellular phone does not need to be connected to any other components of the remote unit. The remote unit can include a printer 130 allowing the technician to generate information such as a formal quotation, virtual view of the new equipment, and an analysis of cost savings, that can be given to the customer. The remote unit also can include a payment device 132, such as a credit/debit card reader, allowing the customer to approve the design and place a deposit or payment for the services. As discussed above, these components can take any of a number of configurations, such as a laptop computer with a cellular modem connected to a digital camera and printer. Another alternative utilizes a PDA phone allowing pictures to be taken with the internal camera phone, data to be entered into a spreadsheet on the device, the information to be transmitted by the device to the base unit, and communication with the base unit through a phone connection or another mechanism such as text messaging. In yet another embodiment, design software can be included in the PDA phone such that when the technician enters the information and captures the images, the design can be done internally through software, and the PDA phone can be used to display the proposal and generated information to the customer. The phone connection can have various uses, such as to ask questions of a designer or obtain approval of the design.

At the headquarters or other location where the information will be received and the design created, in at least some embodiments, a base unit 140 can be used to receive the information. The base unit can include a communication device 144 capable of receiving information from the remote unit 120. The communication device can be any appropriate device, such as a modem, phone, or wireless device. The communication can not only accept information and mages from the remote unit, but can allow personnel at the base unit to communicate with the field technician. The communication unit can include separate devices, such as a modem for data communication and a phone for interpersonal communication.

The base unit also can include a computer graphics program, virtual design studio, or other photo editing device 142 capable of taking the images from the imaging device 122 and either automatically, or manually with input from the personnel, generating a view of the new equipment installed at the actual customer site after the retrofit. The base unit can include a data entry device 146 allowing the personnel to use the photo editor, as well as to enter any additional information for the site and/or design. The base unit can include a display device 148, such as a standard monitor or a projection device allowing personnel to easily see the existing layout during the design process. The base unit also can include a payment device 152 allowing the customer to give verbal approval and account or other information, such as credit card number, whereby the personnel at the base unit can enter the information into the payment device.

The base unit can include a parts and design kit 150. This can be an actual kit, made up of fittings and piping, or can be a virtual or computer generated kit, allowing a design to be generated through software. A combination also can be used, wherein a virtual design is made that the personnel attempt to build using the actual pieces, in order to determine if the design will work and/or if additional information is needed. A design kit allows personnel to design a system that will work for the given equipment specifications, whereby the personnel can determine the improvement in flow and necessary equipment costs.

Figure 2A:
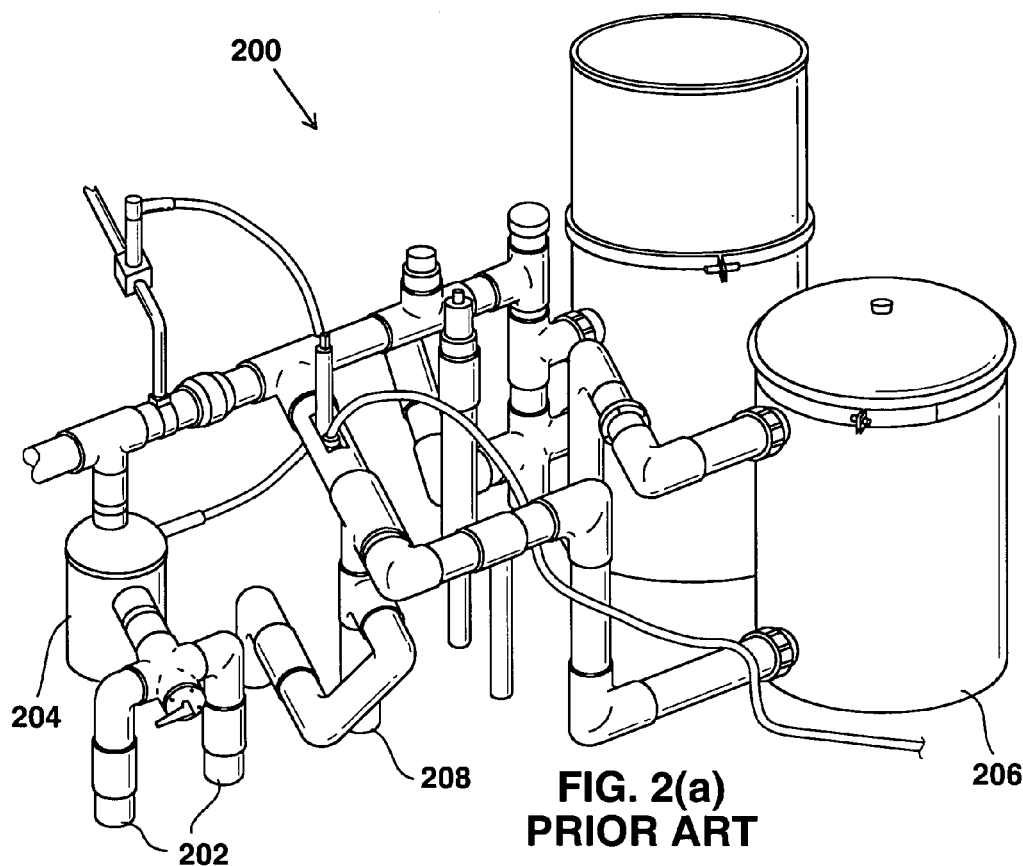
FIG. 2 shows diagrams of (*a*) an equipment system of the prior art and (*b*) an equipment system that can be designed using the communication system of FIG. 1.

The equipment described with respect to FIG. 1 allows a field technician and personnel at a base unit to gather information and design a new flow system all in a single visit to the customer site (although multiple visits could be made as well, such as if the customer did not have time to wait for the design or wanted to discuss the project with a spouse before authorizing). The technician arriving at the location can find an existing equipment pad such as is shown in the prior art diagram of FIG. 2(*a*). The technician can measure and record dimensions such as the spacing of the return lines 202 exiting the cement pad, the distance to the pump 204, the distance from the outlet of the pump to the inlet of the filter 206, and the distance from the outlet of the filter 206 to the return line 208 in the cement pad. The technician also can measure vertical distances where needed, such as distances relative to the top surface of the cement pad, such that the design can be created accurately in three dimensions. By taking images of the equipment pad and sending them to the base unit, a designer at the base unit can determine whether there might be anything blocking a potential path that would not otherwise have shown up in the measurements, as well as to determine whether any additional measurements or information are needed. The images also allow the virtual design to be placed "in" the image of the equipment pad at the customer location, so customers can see what the equipment will look like in their backyards. For instance, after the virtual design 250 has been completed, as shown in the example of FIG. 2(*b*), a view of the piping and equipment can be dropped into the image showing the new pump 252 and filter 254 on the cement pad. The image also can show the new piping going between the equipment, as well as to the suction lines 258 and return line 260.

Providing the designer with at least one image of the site allows the designer to more easily change the path of the piping. The designer can do away with T-junctions and 90° elbows, which can significantly reduce flow, and replace the existing piping with shaped piping runs that have no sharp turns and that can increase the overall flow of the system. For instance, the piping from the suction lines 202 in the prior art device include two 90° elbows, while the piping from the suction lines 258 in the new design includes a single rounded pipe with a much larger turning radius and no sharp turns, allowing the water to more easily flow to the respective pump. Increasing the flow not only provides the benefit of allowing the pump to run less to circulate the same amount of water, thereby reducing energy costs, but also allows for the use of higher efficiency pumps, which can further reduce energy costs. Pumps such as low head pumps or variable r.p.m. pumps, which can require a greater volume of flow through the circulating system, can reduce operating head pressure and allow for a significant reduction in kilowatt consumption.

For example, the wattage of the pump generally can be reduced by a factor of four when the rpm value is reduced by a factor of two, per pump affinity laws. For a pump running at 3450 rpm and drawing ten Amps, a reduction to 1725 rpm will draw only 2.5 Amps. Volume of flow, on the other hand, is only reduced by a factor that is half the reduction factor for rpm, such that the pump in this example will provide 75% of the flow at 1725 rpm, compared to 100% flow at 3450 rpm. If head loss in an existing system can be reduced by 15-20%, such as by utilizing laminar flow piping, the resulting flow can be nearly equal to the full rpm. value, at only about 25% of the kilowatt consumption.

Figure 2B:
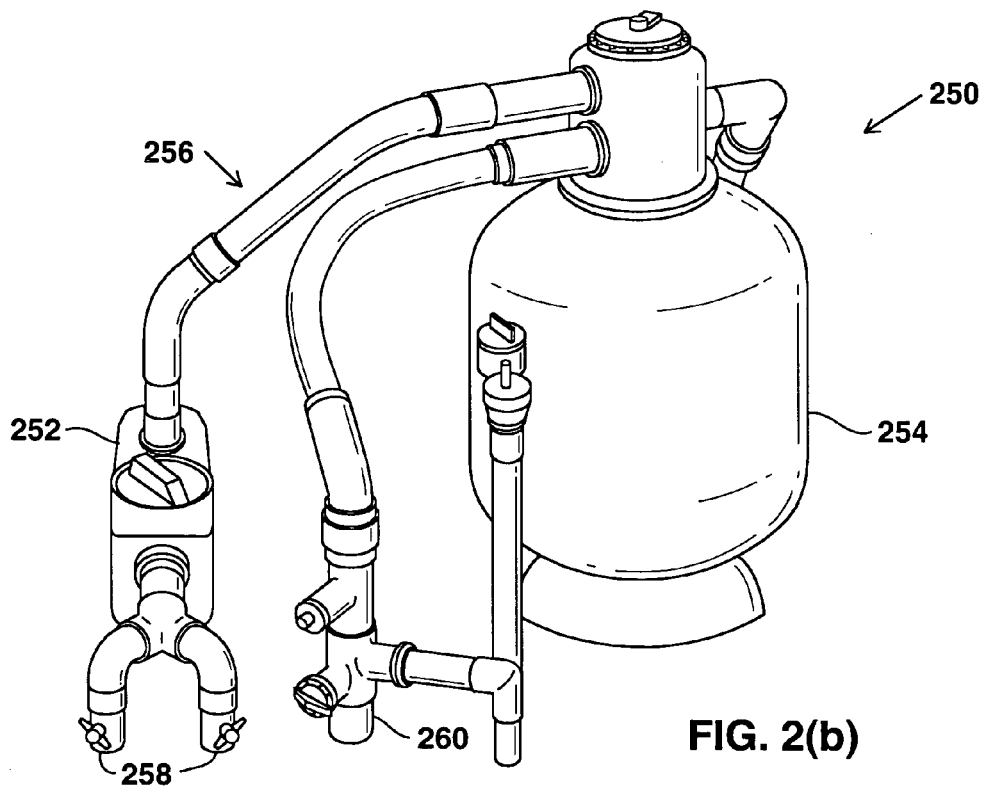
Figure 3:
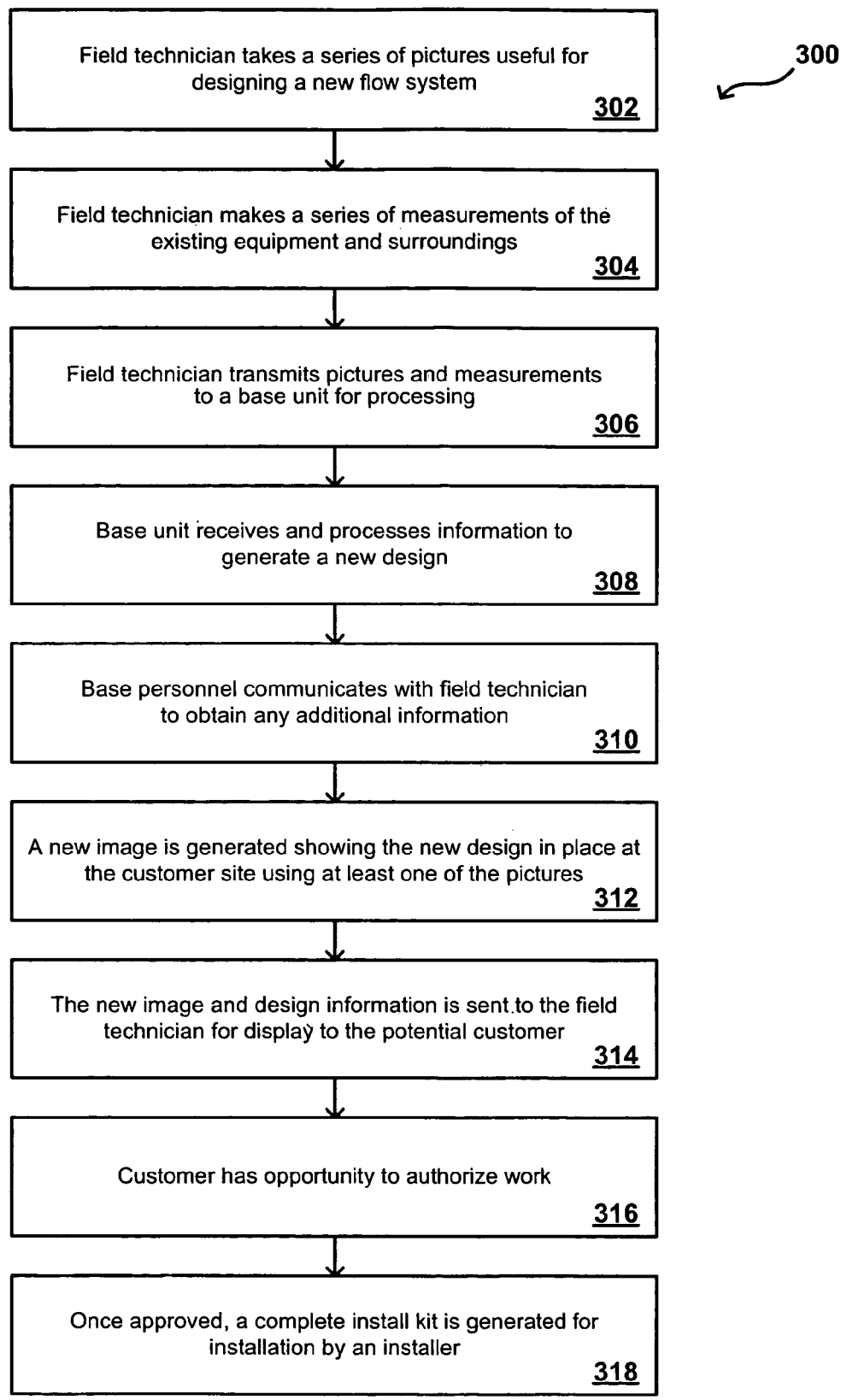
FIG. 3 is a flowchart showing steps of a process that can be followed in accordance with various embodiments of the present invention.

FIG. 3 shows steps of an overall process. 300 that can be used with use the system of FIG. 1 to generate a design such as that shown in FIG. 2(b). In such a process, a field technician takes a series of images useful for designing a new flow system 302, such as images of the equipment pad, existing equipment, the pool, and the surrounding area of the yard. As discussed above, these images can be any appropriate images, such as digital pictures or images created from at least one set of scan data. The technician also can take a series of measurements relating to the pool and equipment, if the measurements are not obtained by the scanner, and that information can be entered into the remote unit 304 to be sent to the base unit. If a three-dimensional scanner is used, dimension information can be transferred directly to a memory device of the remote unit for later transfer to the base unit. In this case, the data entry device can be used simply to input customer information to be stored in the memory device. In an alternative embodiment, customer data can be entered into a data entry device at the base unit before the technician is dispatched, such that there is no need for the technician to enter customer information and a data entry device may not be necessary. It also should be noted that various steps in this method can be done in any of a number of different orders, and that the listing in the method is not meant to imply a sequential order unless otherwise stated. For example, a technician can make measurements before, during, or after taking images, and can communicate with base unit personnel at any time during the process.

Once entered or transferred into the remote unit, the measurement data and images can be transmitted to a base unit for processing 306, such as by uploading the pertinent data to the base unit via a cellular modem of the remote unit. The information can be received by the base unit, such as through another cellular modem, and can be stored in files, databases, or any other techniques known for storing information in an electronic, optical, magnetic, or other appropriate format. Personnel at the base unit can view and/or manipulate the information and images to be used in generating a virtual equipment setup 308. The base unit personnel and the technician can communicate with each other before and/or during the design process to discuss the information and images, as well as to gather any additional information needed to generate an accurate design 310. Once the virtual design is created, a new image can be generated including the proposed design setup, and information can be generated regarding equipment costs and energy savings 312. The new image(s) and information can be sent to the technician for display or other communication to the potential customer 314. The owner can select to authorize the work based on the image and information, all of which can have been generated during a single visit by the technician 316. From the design, a piping and equipment kit can be generated that includes everything (at least from a component standpoint) that a technician will need to retrofit the existing equipment pad. An installer then can install the kit using only basic tools and without the need to locate, cut, or otherwise obtain any additional parts during the installation process 318. In order to better explain such a process, individual steps of an exemplary process will be discussed below in further detail. These explanatory processes are not intended to limit the scope of the overall process, but only to explain the implementation of such a process in accordance with one embodiment.

Figure 4:
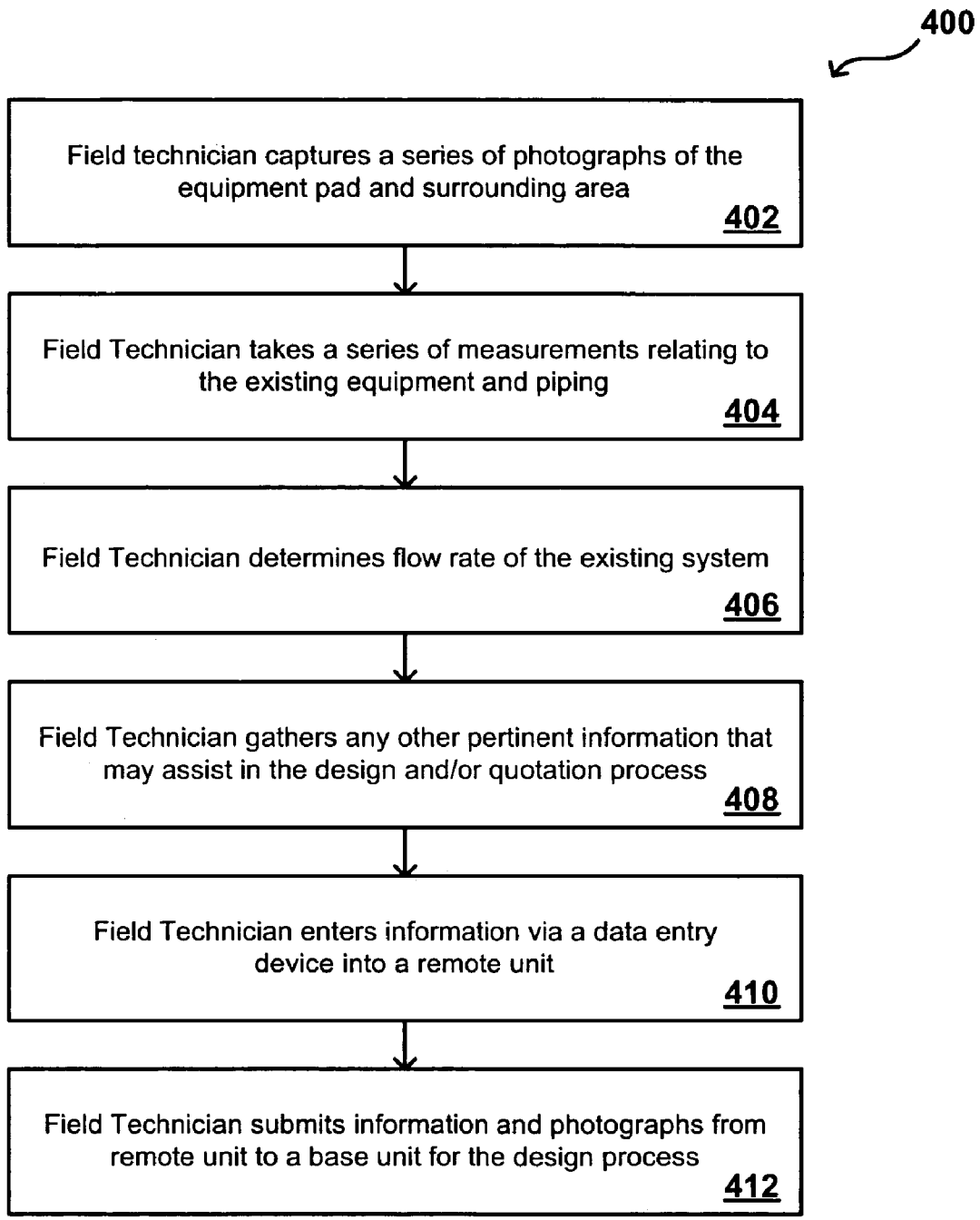
FIG. 4 is a flowchart showing steps of a process that can be followed in accordance with various embodiments of the present invention.

FIG. 4 shows steps of an exemplary process 400 by which a field technician can obtain information for an installation for which a design is to be generated. As discussed above, a field technician can take a series of images of the installation, which can include images of the equipment, the relationship of the equipment to the pool, parts to be retained or replaced, pipes of interest (such as the chase pipe, suction pipe, return pipe, and cleaner pipe), and the surrounding area 402. At least one of these images can be a top-down image of the equipment pad showing the relationship of the equipment and pool lines. Another image can shown the relationship of the pad to the pool. The number and type of images taken can vary by installation, but should be sufficient to show a view of each critical component necessary for the retrofit. The images can be taken with any appropriate imaging device, such as a digital camera or three-dimensional scanning device, which can be internal to the communication device used to send the information to the base unit, such as a cellular PDA phone with a built in camera, or can be separate but connected to, or otherwise in communication with, the communication device. In an alternative embodiment, a cellular phone with a built-in camera can be used to take and transfer images, as well as to provide for voice communication, but can be separate from a data entry device, and/or scanner, and data transfer device used to transfer dimension information.

The field technician also can take a series of measurements 404, before, during, or after the capturing of the images. The number of measurements can vary by installation, and can be dependent upon factors such as the number of critical features, number of obstructions, and relative positions of the features and/or obstructions. Critical dimension measurements can include the horizontal and vertical distances between any fittings to which new piping is to be attached, such as the return pipe feed, heater, and/or risers coming out of the cement. Other critical measurements can include the available space on the pad once the old equipment has been removed. An exemplary minimal set of measurements can include the separation in two dimensions of the suction and return lines, as these positions typically are fixed in the cement pad unless the pad also is to be replaced. The measurements to be taken can be known by the technician beforehand, or can be prompted by software on the data entry device. For instance, a series of options of equipment types can be displayed to the technician, such that the technician can select the appropriate type. From that selection, a series of measurements can be requested by the software that guide the technician through the measurement process. If a scanner or radar is used, the software can guide the technician through the scanner placement process such that the necessary measurements can be captured.

In order to generate a rough estimate of energy savings of a new installation, a field technician or base unit personnel can simply compare the kilowatt reduction in moving from an existing pump to the new pump. This rough estimate would not take into consideration the effect on. flow of the piping improvement, which should easily add at least 10-15% to the savings due to the new pump. The technician can use an ammeter to take an amp reading for the main pump, as the actual value sometimes is different from what is printed on the pump label.

In order to provide a more accurate estimate of energy savings, the field technician can gather information about the current flow rate of the pool equipment 406. In one embodiment, the technician can screw a vacuum gauge into a drain port on the existing pump, and can utilize a pressure gauge on top of the filter. The technician then can multiply the reading (in inches of mercury) on the vacuum gauge by 1.13 to obtain the head of the suction piping between the pool and the pump. The resultant value can be added to the reading on the pressure gauge (multiplied by 2.31 to get the reading in feet of head on the pressure side between the pump and the pool), to get a good estimate of the total dynamic head (TDH). For example, if the suction reading is 16" of mercury (×1.13=18.08') and the pressure reading is 22.5 psi (×2.31=51.97') then the TDH of the existing system is approximately 70.05'. If the TDH of the new system is projected to be about 40.00', then there will be a reduction in head loss of about 30', which allows the pump to be run for an amount of time each day that is about 40% less than is necessary for the existing system. In order to get a true estimate of energy savings, it would be necessary to know the distance to the pool, the number of fittings, and other information, which cannot always be readily obtained as part of that information is buried underground.

The technician can gather any other necessary information, such as distance to the pool or area information, as well as any necessary customer information 408. All this information can be entered via the data entry device, such as by typing the information into a form in a word processing program or spreadsheet, selecting checkboxes or radio buttons in a computer window, or any other ways known for entering data into a data processing or storage device 410. A certain amount of intelligence can be built into the forms to guide the field technician through the measurement collection and entry process. In one embodiment, other than typing in the customer information, all measurement and equipment data can be entered using a single selection action, such as a click of a mouse or stylus. The field technician can submit this information from the remote unit to a base unit located off-site, such as at a headquarters or central office location 410. This submission can be accomplished via any technological approach known for sending information, such as through any of a number of wireless data transfer mechanisms. The information and images can be sent together, or separately. For example, if the images are taken with a camera phone but the data is entered into a laptop, the technician can have the option of uploading the images to the laptop then submitting the images through a wireless modem of the laptop, or can choose to submit the images directly from the camera phone. The technician can contact personnel at the base unit 412, before, during, or after submission of the information. The technician can inform the personnel that the information has been gathered, allowing persons reviewing the information at the base unit to ask questions about the existing installation. These questions can include interpretations of included information or requests for further information. In an alternative embodiment, the information is sent as a message to the base unit. Once the message is received, a person monitoring the base unit can contact the technician after reviewing the information. The timing and number of contacts can vary as necessary. The contacts can be audio, video, text, or any other appropriate ways for communicating between the person at the base unit and the technician. The technician can provide any additional information over the phone, for example, or can enter the additional information via the data entry device of the remote unit and submit the information electronically.

Figure 5:
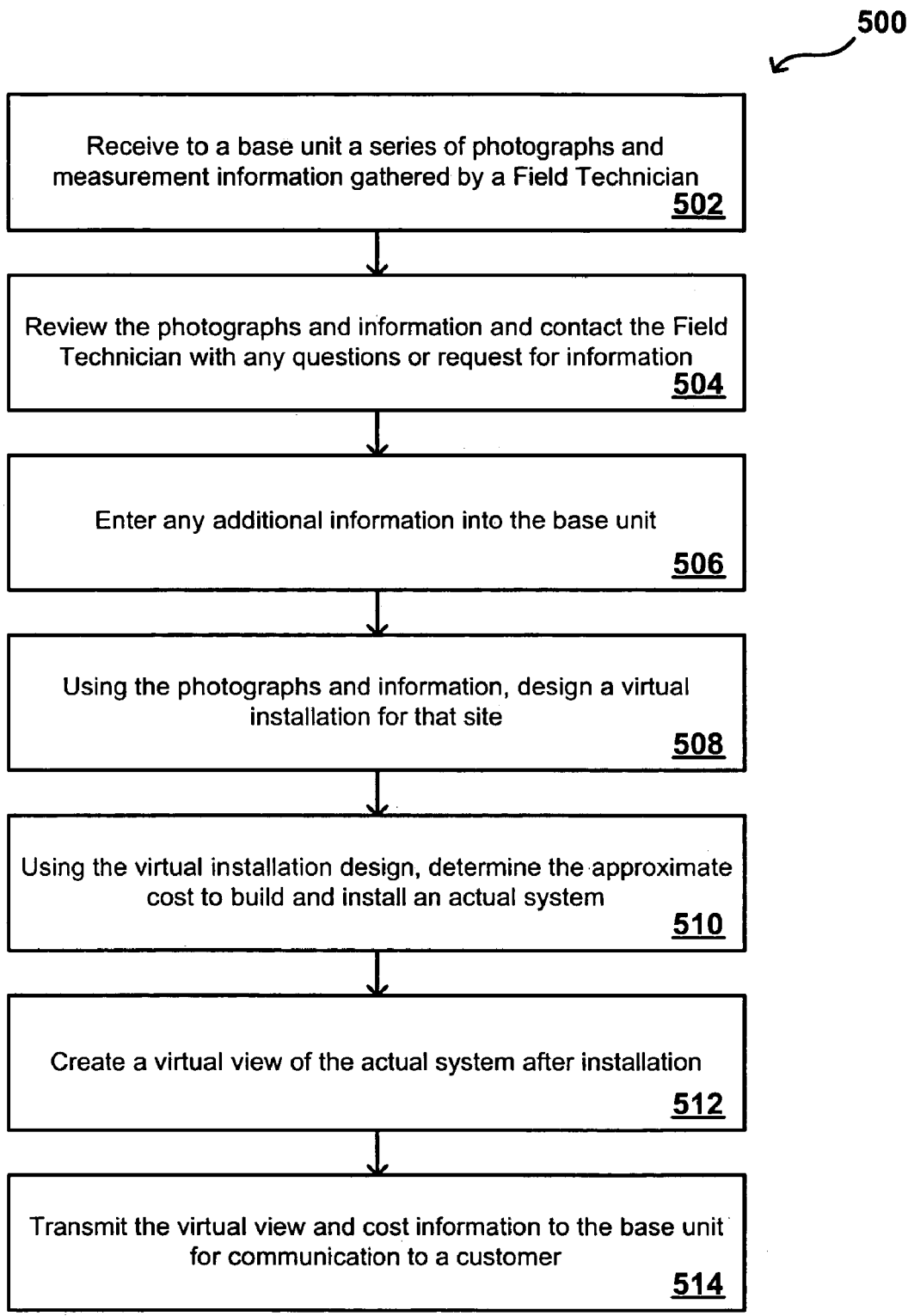
FIG. 5 is a flowchart showing steps of a process that can be followed in accordance with various embodiments of the present invention.

FIG. 5 shows steps of an exemplary process 500 by which personnel monitoring the base unit can receive information from a field technician and use this information to design a virtual system for the installation. As discussed above, a communication device of the base unit can receive a series of images of the installation, including images of the equipment, the pool, and the surrounding area, as well as customer and/or measurement information gathered by the technician 502. The information can be received by an operator of the base unit, who then can transfer the information to a designer (such as where a person is doing the design work by hand), or the information can be received directly by the designer. For simplicity of explanation, it will be assumed that the information is received by a designer. The information in one embodiment is imported into a spreadsheet program, which includes a number of formulas, as well as preset electricity costs and other selectable options. The spreadsheet can be tied to a central database that includes parameter values where appropriate, such as material costs, and that can be used to store the information for each job, design, and/or quotation. In another embodiment, the information is imported directly into a customized design program that automatically generates the design and uses information stored in a central database to compute values such as design costs and energy savings. The automatic design generation and cost computations can be done at the base unit or at the remote unit. If done at the remote unit, the design and values can be transmitted to the base unit for approval.

Once the information is received from the field technician, and the designer has had an opportunity to review the images and information, the designer can contact the field technician to request further information 504, such as additional dimensions or clarification of existing numbers. The designer also can contact the field technician during the design process, where additional questions may arise. The communication from the designer can come via any appropriate mechanism, such as a cell phone call or text message. The designer can enter the additional information into the base unit 506 in order to ensure that the information is saved for later use.

Once the designer has received all (or at least a minimum amount of) the necessary information, the designer can generate a sample equipment pad based on the information and images 508. The designer can determine the appropriate equipment (such as a pump of appropriate size) to be installed and connected in the sample pad. The sample pad can be a three-dimensional design created through a computer graphics program or virtual design studio using computer-generated parts, for example, or can be a physical model created using fittings and piping to create a physical structure. Methods for making virtual models using computer design programs are known in the art and will not be discussed herein in detail. If the design is done by computer, then any appropriate computer assisted drafting program can be used that is capable of generating a three-dimensional design allowing for precise measurements of dimensions to be made. If a physical model is made, fixed fittings and piping and/or variable fittings and piping can be used to create the model. By fixed fittings and piping, it is meant that the designer can have available a large number of fittings and pipe runs of different angles and sizes, such that these pieces can simply be connected appropriately to create the design. By variable fittings and piping, it is meant that the shape and/or size of each component can be altered, such as by bending a flexible run of pipe, in order to arrive at the final design. Using flexible components can be more accurate for the final design, as customized fittings and pipe runs can be made in order to maximize flow and minimize material cost. Using flexible fittings also allows for a more accurate material cost estimate where customized piping is to be used. The entire redesign process can take less than an hour, such as 10-15 minutes for a basic system and 40-60 minutes for a more complex system.

Once the design is completed, the designer (or another appropriate person or device) can determine the approximate cost to implement the design 510, using factors such as types and numbers of fittings and amount of material takeoff. A series of pull-down bid templates can be provided to provide for fast and simple quotations. For a physical design, this can include taking actual measurements of the piping runs. For computer assisted designs, the calculations of lengths, widths, etc., can be done automatically through software, such that the total cost can be obtained at the end of the design process or can be updated continually throughout the design. The calculations also can determine the approximate cost savings, such as by factoring in the approximate improvement in flow and the reduction in power usage by a new pump.

In order to estimate energy savings, a number of formulas can be used, such as:

$$\text{Kilowatts per hour consumed} = \text{Amps} \times \text{Voltage} \times 10\% \text{ power loss factor}/1000$$

This result can be used to determine the annual energy consumption by estimating the total number of hours of operation per year. For example, in a pool with a main filter pump and a cleaner/booster pump, the energy consumption for a 9.1 Amp/240V main pump, considering a 10% power loss factor, uses about 1.966 kW/hour. If this pump is run for 8 hours a day at $ 0.20 per kW/hour, then the annual cost to run the main pump will be about $1,148.04. For a 5.2 Amp/240V booster pump run 3 hours a day, the annual cost is about $245.96, for a total annual energy cost of about $1,394 to run both pumps. For a proposed replacement system, using a single 1.9 Amp/240V main pump, running 8 hours a day, the annual energy cost is about $239.69. By improving the flow through piping, such that this lower power pump can be used, the customer then can expect a projected annual energy savings of about $1,154.30, or about an 83% savings.

Once the flow of the system is measured, the increase in flow (as a function of percent) can be used to reduce the amount of necessary run time of the pump to obtain the same throughput. For instance, if the flow is increased by 15% then the pump can run 15% less than is currently necessary. As discussed above, there is no easy way to know the exact underground piping configuration, such that total dynamic head often must be estimated. Certain suppositions about the piping can be used, such as average parameter values for runs of distance, such as average flow over a distance using standard PVC plumbing. In one embodiment, retrofits are estimated to obtain on average a 70% improvement in electrical costs, using both redirected flow and a new pump, with an overall range of about 25%-85% in energy savings.

A virtual view of the completed design also can be created 512, such as by adding skins to virtual components and adding the actual images as a background, or by opening at least one of the images in a photo editing program and using piping templates to form a view of the approximate design. The designer also can shoot a physical design against a background such as a green screen (as known in the art) and drop the design onto one of the images. Many other approaches for creating a virtual view in a digital image are known, and ways for implementing each of these will not be discussed herein in detail. A view of the completed design, as well as pricing information and estimated cost savings, can be sent to the field technician 514, such as by using any of the devices discussed above for transmitting info between the base unit and remote unit.

Figure 6:
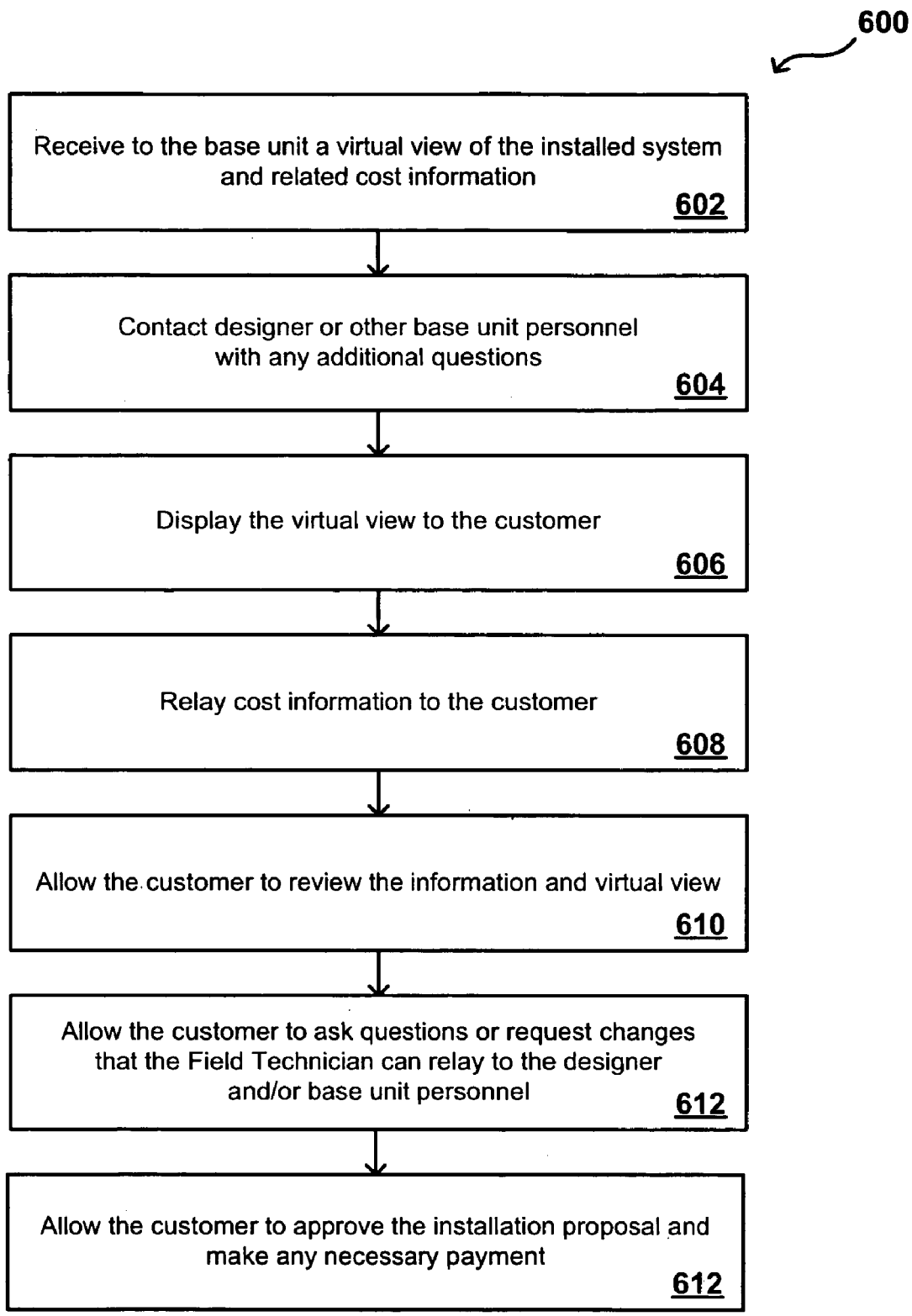
FIG. 6 is a flowchart showing steps of a process that can be followed in accordance with various embodiments of the present invention.

FIG. 6 shows steps of an exemplary process 600 by which the field technician can use the information received back from the base unit. As discussed above, a communication device of the remote unit can receive the virtual design, as well as information about the pricing for the project and the projected energy savings 602. This information can be shared with the potential customer during the same visit, as opposed to a subsequent visit as in previous systems. The field technician can have the opportunity to contact the designer or other base unit personnel with questions or comments before presenting the results to the customer 604. The technician can show the design to the customer 606, such as by bringing up the design on a display such as a laptop or PDA screen. Alternatively, the technician can use a projector to project images on a wall or other surface, or can print out a version to show the customer. The technician also can relay the pricing and cost information 608 using similar display devices, and can have the option of printing out forms such as a pricing form, cost savings form, plan layout, estimate, and/or contract. Once the potential customer has a chance to review the information 610, the customer can have the opportunity to request changes or ask additional questions 612, which can be transmitted to the base unit if necessary, with a response transmitted back to the remote unit for the technician to relay to the customer.

After reviewing the proposal and asking any questions or making any changes, the customer can have the option of approving the work at a later time, or can choose to authorize the retrofit/design work during the visit by the field technician 614. There are any of a number of ways for the customer to authorize the work, such as by signing a contract and handing the field technician a check, or having the technician call the base unit or type information into the remote unit to provide a credit card number. In another embodiment, the remote device can include; or be connected to, a payment device such as a credit/debit card reader than can allow the customer to pay for the transaction immediately. This can include a deposit or full payment, depending upon factors such as the work being done and any applicable contractor limitations.

Once the work is authorized and payment (or at least a deposit) is received, a kit can be created that includes all the necessary parts to retrofit the equipment pad. This kit can include, for example, all the fittings and piping, whether standard or customized, as well as any connecting hardware, a new pump, and any other necessary equipment. Alternative kits can minimally include only any customized piping and/or fittings. The kit can allow the installer to arrive at the location bringing only a standard tool set. The kit can be delivered to the installer, or can be delivered to the customer's address. When the installer arrives, the installer can remove any unnecessary equipment before the retrofit. The kit can come with a set of step by step instructions, and/or a series of diagrams, showing the installer how to install the new equipment and piping. The instructions in one embodiment are generated automatically by the design software. The instructions also can come with a parts list or any other information typically enclosed with a kit to be assembled. The parts of the kit also can be individually labeled for ease of assembly, and can be labeled or configured such that each part can only be installed in the correct orientation. The ability for the installer to simply connect the components can significantly reduce the install time, and therefore the installation cost, as well as reducing the likelihood for errors in the installation process. Further, a simplified installation process allows a less experienced installer to do the retrofit work, such that labor costs can be further reduced. Experienced people instead can be used to monitor the base unit and/or do the design work. Where an installer of an existing system would have to execute tasks such as measuring pipes, cutting pipes of the appropriate length and fitting pipes using existing components, and ensuring proper flow for the given system, an approach in accordance with various embodiments of the present invention allows an installer to simply remove the old equipment and piping, install the new pump, and attach the customized piping simply by screwing or otherwise connecting the new piping to the existing fittings and equipment. The entire process now can take on the order of four hours or less, much of which is involved in removing the existing equipment.

Although described with respect to pool systems, there are a number of other industries that can utilize such a two-way communication design process to improve accuracy and reduce the amount of time necessary for the field technician and the customer in order to arrive at a design. While improved flow designs can be used for applications such as irrigation design, water flow, air flow, and power plants, any retrofit that has to design around existing two- or three-dimensional limitations can benefit from such an approach. Even designs of new installations can benefit by such an approach, where images and dimensions of the location for the design can be sent along with other necessary information in order to obtain a design and quote during a single customer visit.

As discussed above, much of this functionality can be obtained through software at either the remote unit or base unit. This functionality can be stored in code form on any computer readable medium known or used in the art, such as but not limited to internal memory, external memory, hard disks, optical discs, magnetic discs, CD-ROMS, DVD-ROMS, memory sticks, and memory cards. The functionality also can be in code form in any of a number of signals transmitted to or from the units. The base unit and remote units can include any appropriate device capable of sending, receiving, and processing data. The functionality of the base unit can be contained in the remote unit in some embodiments, such that no communication is necessary unless circumstances dictate otherwise.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method of retrofitting elements of an existing circulation system for a pool in order to improve fluid flow comprising the steps of:
    obtaining a plurality of measurements at a pool site selected from the group consisting of distances between existing fittings and the separation distance between suction and return lines;
    transmitting the measurements to a technician at a remote design location;
    at the remote design location, creating a virtual design for the retrofit based on the measurements, said virtual design including new fittings and piping configured to improve fluid flow through the circulation system;
    at the remote design location, generating pricing information sufficient to generate a cost estimate for the retrofit; and
    transmitting the pricing information to the pool site.

2. A method as recited in claim 1, further including the steps of:
    at the remote design location, generating information estimating the cost or energy saving to be gained by the retrofit; and
    transmitting to the pool site the estimated saving information.

3. A method as recited in claim 1, further including the step of transmitting an image of the virtual design from the remote design location to the pool site for approval.

4. A method as recited in claim 1, further including the steps of:
    building a retrofit kit based on the virtual design including the new fittings and pipings;
    delivering the retrofit kit to the pool site; and
    installing the retrofit kit into the circulation system at the pool site.

5. A method as recited in claim 4, further including the step at the remote location of generating installation instructions for the retrofit kit.

6. A method as recited in claim 1, further including the step at the pool site of generating digital pictures of the circulation system and transmitting said pictures to the remote design location for use in creating the virtual design.

7. A method as recited in claim 1, wherein said measurements include
    (a) distances between existing fittings;
    (b) separation distance between suction and return lines; and
    (c) an estimate of the total dynamic head.

8. A method as recited in claim 1, further including the step of establishing a verbal communication link between the remote technician and an installer at the pool site to facilitate transfer of additional information about the pool to the remote technician.

9. A method of retrofitting elements of an existing circulation system for a pool in order to improve fluid flow comprising the steps of:
    obtaining a plurality of measurements at a pool site selected from the group consisting of distances between existing fittings and the separation distance between suction and return lines;
    transmitting the measurements to a technician at a remote design location;

at the remote design location, creating a virtual design for the retrofit based on the measurements, said virtual design including new fittings and piping configured to improve fluid flow through the circulation system;

at the remote design location, generating pricing information sufficient to generate a cost estimate for the retrofit;

at the remote design location, generating information estimating the cost or energy saving to be gained by the retrofit; and transmitting to the pool site an image illustrating the virtual design, the pricing information and the estimated saving information.

10. A method as recited in claim 9, further including the steps of:

building a retrofit kit based on the virtual design including the new fittings and pipings;

delivering the retrofit kit to the pool site;

installing the retrofit kit into the circulation system at the pool site.

11. A method as recited in claim 10, further including the step at the remote location of generating installation instructions for the retrofit kit.

12. A method as recited in claim 9, further including the step at the pool site of generating digital pictures of the circulation system and transmitting said pictures to the remote design location for use in creating the virtual design.

13. A method as recited in claim 9, wherein said measurements include (a) distances between existing fittings;
(b) separation distance between suction and return lines; and
(c) an estimate of the total dynamic head.

14. A method as recited in claim 9, further including the step of establishing a verbal communication link between the remote technician and an installer at the pool site to facilitate transfer of additional information about the pool to the remote technician.

15. A method of retrofitting elements of an existing circulation system for a pool in order to improve fluid flow comprising the steps of:

obtaining a plurality of measurements at a pool site selected from the group consisting of distances between existing fittings and the separation distance between suction and return lines;

transmitting the measurements to a technician at a remote design location;

establishing a verbal communication link between the remote technician and an installer at the pool site to facilitate transfer of additional information about the pool to the remote technician;

at the remote design location, creating a virtual design for the retrofit based on the measurements, said virtual design including new fittings and piping configured to improve fluid flow through the circulation system;

building a retrofit kit based on the virtual design including the new fittings and pipings;

delivering the retrofit kit to the pool site; and installing the retrofit kit into the circulation system at the pool site.

16. A method as recited in claim 15, further including the steps of at the remote design location, generating pricing information sufficient to generate a cost estimate for the retrofit; and transmitting the pricing information to the pool site for approval prior to the building step.

17. A method as recited in claim 15, further including the steps of:

at the remote design location, generating information estimating the cost or energy saving to be gained by the retrofit; and transmitting to the pool site the estimated saving information.

18. A method as recited in claim 15, further including the step of transmitting an image of the virtual design from the remote design location to the pool site for approval.

19. A method as recited in claim 15, further including the step at the remote location of generating installation instructions for the retrofit kit.

20. A method as recited in claim 15, further including the step at the pool site of generating digital pictures of the circulation system and transmitting said pictures to the remote design location for use in creating the virtual design.

21. A method as recited in claim 15, wherein said measurements include (a) distances between existing fittings;
(b) separation distance between suction and return lines; and
(c) an estimate of the total dynamic head.

* * * * *